Oct. 5, 1965 C. BREEN ETAL 3,210,475
DIRECT STATION SELECTION CIRCUIT
Filed June 8, 1961
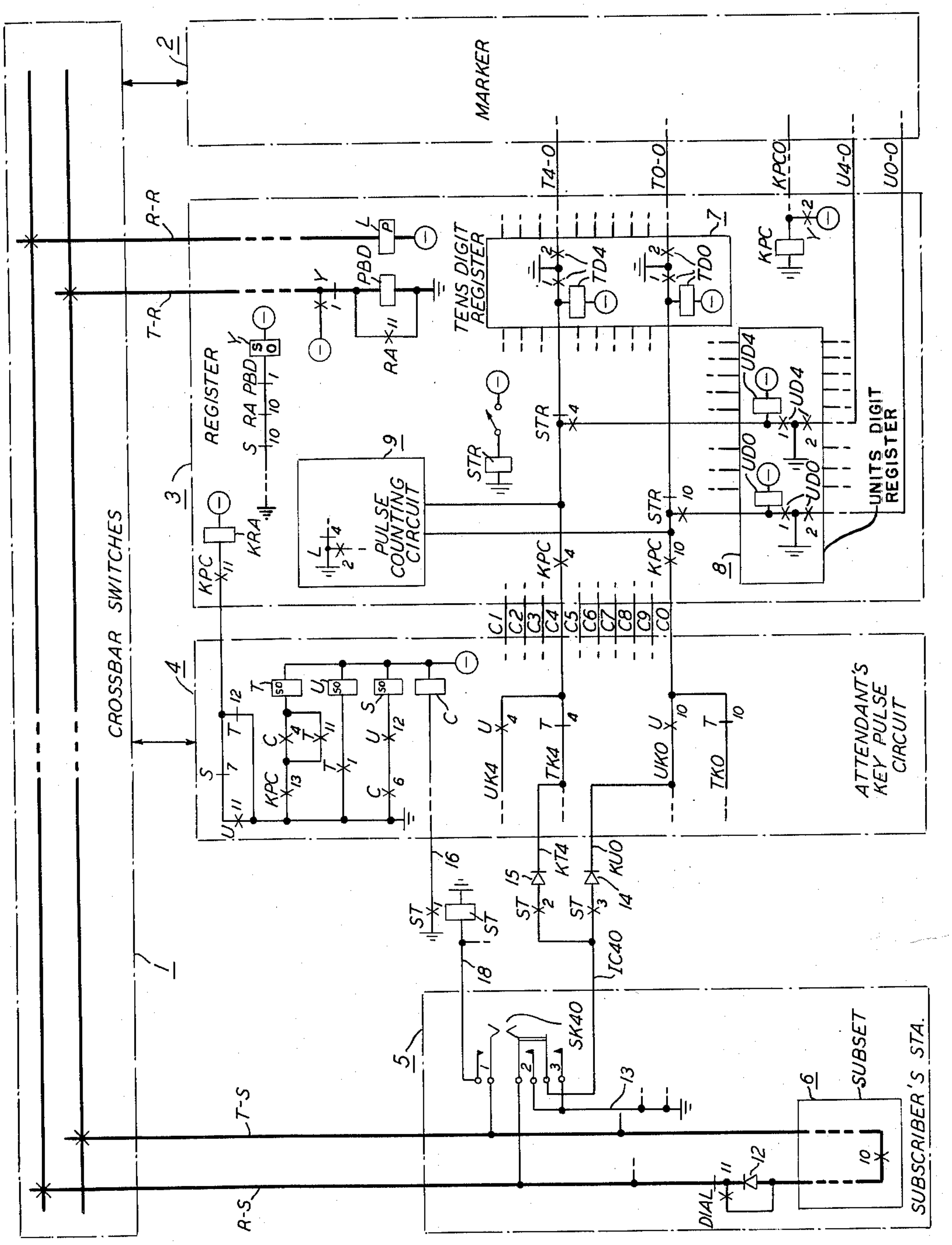
INVENTORS C. BREEN
H. J. MICHAEL
BY S. E. Hollander
ATTORNEY United States Patent Office 3,210,475
Patented Oct. 5, 1965

3,210,475

DIRECT STATION SELECTION CIRCUIT

Charles Breen, Mineola, and Henry J. Michael, Rockville Centre, N.Y., assignors to Bell Telephone Laboratories, Incorporated, New York, N.Y., a corporation of New York Filed June 8, 1961, Ser. No. 115,799
7 Claims. (Cl. 179—18)

This invention relates to automatic telephone systems and is concerned particularly with improved means for facilitating the placing of calls from subscriber stations in such systems.

In present telephone systems, the traditional manual subscriber dialing remains by far the most common means of signaling from subscriber stations. This is to be contrasted with the many improved signaling techniques available within the modern central telephone plant. The persistence of subscriber dialing is to be explained not only in terms of customer familiarity with and acceptance of it nor solely in terms of the huge investment in existing station equipment. At least as important is the fact that almost the entire telephone exchange network is adapted to receive data from subscriber stations in the form of dial pulses. It will be noted that even some of the most sophisticated electronic telephone exchanges are designed for dial pulse input.

In spite of the many advantages of the conventional signaling arrangement, however, considerable attention is being devoted to its improvement or supercession. The specific improvements desired are such as will simplify subscriber participation in the signaling process and as will render the signaling itself more efficient in keeping with the vastly improved efficiency of the modern telephone plant. Thus it is sought to increase the speed of information transmission to central exchange equipment in order to reduce the time this expensive equipment is occupied in the completion of a call, to make more immediately available to subscribers the speed capabilities of central equipment, and to reduce the time a subscriber must be active in placing a call. It is sought to reduce the amount of memory required of the subscriber and to thereby relieve him of some of the inconvenience of translating from the conventional to a telephone coded designation of the destination of his calls. Finally, it is sought to attain these objectives simply, economically, and while retaining the flexibility and selectivity of the telephone network. It is naturally desirable, and usually essential, that specific improvements be compatible with existing equipment.

Existing developments offering one or more of the improvements indicated may be divided into two general classes: in one, an entire segment of the telephone network, such as a central office or PBX, may be basically modified so as to afford improved signaling apparatus to all of the stations associated therewith; in the other, special equipment is provided to stations which by virtue of their location, importance, or the particular needs of the user warrant special treatment. Exemplary of the former class are exchanges, electronic or conventional, adapted to receive information from stations according to pushbutton, or tone signaling. While representing a substantial advance in the speed of signaling made available, such exchanges exhibit certain deficiencies. Thus, there appears to be little or no increase in accuracy afforded here, nor is the amount of memory required of the calling subscriber reduced. But particularly onerous is the problem of compatibility with existing equipment that these exchanges present. This is an important consideration in the case of PBX's where, with the increased integration of the telephone network brought about by the use of direct "out-dialing" facilities, a PBX subscriber must be provided with signaling equipment suitable to cooperate with other telephone exchanges than his own.

Exemplary of the class of developments suited to use at specially situated stations are automatic electromechanical dialers, key telephone systems, and direct station selection apparatus afforded operators or attendants. Automatic dialers transmit dial pulses at a greater rate than a subscriber does, and their output is compatible with existing equipment. In addition, some automatic dialers may be preset semipermanently so that a calling subscriber need only press a key labelled with the conventional designation of a frequently called station (e.g., "Shipping Department"), thereby reducing the chances of inaccuracy and the memory requirement on the calling subscriber. Such devices are open to the objections that the transmission time required thereby is still substantial, and that they are expensive.

Key telephone systems are semiautonomous adjuncts to the regular telephone network which provide expedited calling and special service facilities among the few stations associated therewith. The system may provide transfer and conference cooperation with the regular network, but special calling facilities such as single digit dialing or single destination key operation is restricted to the stations of the key system. Such systems therefore tend to be less flexible and economic than those in which special services are provided by the central equipment of a telephone exchange where the virtues of centralization, flexibility, and selectivity among a large number of stations are present. This is particularly clear in the case of PBX's where the superimposed key system will typically involve a large amount of auxiliary equipment only indirectly accessible to general exchange traffic. In addition, modification of the station composition of the key telephone network will involve extensive equipment changes among peripheral station locations instead of a simple modification of central equipment.

PBX attendants, by virtue of their proximity to the central exchange equipment and the large amount of traffic they handle, may warrant the expense of specialized call completion apparatus. Exemplary of such apparatus is that shown in M. L. Benson et al. Patent No. 3,050,588, issued August 21, 1962. There, a PBX attendant is provided with one key to prime the PBX register with the number of the corresponding station, to which an incoming trunk call will thereafter be completed automatically. In the Benson et al. arrangement, the PBX register is modified to accept keyed information from the attendant via a special auxiliary input, instead of the dialed information which is received as an incident to the placing of calls from the PBX subscriber stations. Such direct key selection of called stations is perhaps as expeditious a method as may be devised for placing calls to a limited number of frequently called stations. Direct key selection is fast, simple, accurate, and, since a single key may bear the conventional designation of the station associated therewith, convenient for memorization. In addition, it is an economical provision as far as attendant position application is concerned. While the Benson et al. apparatus is suited in every way to this application, certain difficulties stand in the way of providing such apparatus to every PBX station which may warrant special calling facilities as to some frequently called numbers. Thus, the amount of equipment required would be prohibitive in cost. Again, there is the problem of distinguishing between ordinarily serviced and specially entitled calling stations with respect to the registration facility. This is relatively straightforward in the case of the uniquely situated attendant handling a functionally distinguishable class of calls (trunk calls), but is not so as among all of the stations of the PBX. Furthermore, it is desirable that the selectivity and flexibility afforded by the PBX switch train, as well as the ability to place ordinary dial pulsed calls be retained by any specially provided stations.

From the foregoing discussion, it will be aparent that the most attractive arrangement for supplying expeditious calling facilities to subscribers of an exchange will be one having the advantages of direct station selection but compatible with and united to the general telephone network.

It is, therefore, the principal object of this invention to provide improved subscriber station signaling apparatus which is compatible with existing telephone equipment.

It is another object of the invention to provide at stations of an exchange auxiliary means for directly selecting other stations of the exchange.

It is yet another object of the invention to provide at a station of an exchange two means for signaling to a common register circuit, one means being in common use in the exchange and the other means being specially adapted to provide expeditious signaling.

It is still another object of the invention to provide in a telephone exchange station having two modes of signaling and a register having separate inputs, one of the inputs being adapted to distinguish among calls as to the mode of signaling to be employed in establishing them.

A further object of the invention is to provide a register having two inputs, one of the inputs being associated with the telephone exchange switch train, adapted to receive data according to a first mode of signaling, and effective if a second mode of signaling is to be employed to enable the other input.

Yet another object of the invention is to provide a station of an exchange with special means for signaling and to provide a register having a switch train input and an auxiliary input, the switch train input having control of registration at the auxiliary input via the station line and the special means for signaling.

The foregoing objects are satisfied in an exemplary embodiment of the invention wherein customers in a common control crossbar PBX are afforded direct station selection. The PBX includes a common register circuit which has two inputs, at either of which a called line designation may be received and registered. One of these inputs is adapted, in accordance with conventional practice, to receive the designation of a called line in the form of dial pulses emanating from a calling station whose station line has been extended to this input via the crossbar switches. The other register input is of a type conditionable from a calling station equipped to automatically signal the register in accordance with a single direct-current pulse per digit of the called line designation.

Stations of the PBX equipped for direct station selection are provided with a single key per frequently called number in addition to the standard station equipment. When such a station initiates a call to another station corresponding to one of the keys, the station line first will be extended to the standard input of the common register in accordance with standard telephone practice. Upon receiving dial tone, the calling customer will operate the appropriate key. Operation of the key grounds a single conductor identification of the called station, prepares a circuit for extending toward the second register input all such conductors associated with that calling station, and unbalances the station line toward the register's standard input. At the standard input the condition of imbalance is detected, and as a result the second input is enabled and a special signal returned to the calling station line from the standard input via the regular switch train. This special signal is coupled through the operated key to operate a relay individual to the station. This relay extends the energized identification conductor toward the register second input, and thus commences the automatic registration of the called line designation in the register. Registration completed, the call proceeds conventionally.

The specially equipped station retains its dial pulse equipment. Calls to PBX stations for which keys are not provided, as well as calls beyond the PBX may thus be made in the usual manner. On calls to stations for which keys are provided, there remains the option of dialing.

A feature of the invention is means whereby a subscriber at one station of an exchange may directly select another station of the exchange under the control of a common register circuit.

Another feature of the invention is a telephone exchange register having a switch train input including means to ascertain whether a station line extended to that input is to be permitted to send data to the register via another input.

Still another feature of the invention is a telephone exchange register which may control, via a station line extended to one input thereof, registration from the calling station via another input thereof.

Yet another feature of the invention is a telephone exchange having stations specially equipped to signal a register via two different routes, the special equipment including means operative by the register over one of these routes to permit signaling from the station to the register over the other route.

A further feature of the invention is a telephone exchange register having a switch train input adapted to receive dial pulsed information over station lines conventionally extended thereto, and having means for detecting a non-standard condition on an extended calling line and for thereupon enabling an auxiliary input of the register adapted to receive information from the calling station according to a different mode of signaling.

An appreciation of these and other features of the invention can be had upon consideration of the following description and the drawing which shows an illustrative embodiment of the invention in combination with a crossbar PBX.

In an exemplary embodiment, the present invention finds application in the common control crossbar PBX disclosed in R. D. Williams Patent 2,904,637 of September 15, 1959 (hereinafter designated the Williams patent or disclosure), as modified for direct station selection by an attendant in accordance with M. L. Benson et al. Patent 3,050,588, issued August 21, 1962 (hereinafter designated the Benson et al. patent or disclosure). The Williams patent shows a PBX having a common dial pulse register to which a calling station is connected automatically upon initiating a request for service. The register receives and stores the dial pulsed called number, whereupon a marker completes a connection between the calling and called stations in accordance with the registered information. The Benson et al. patent teaches a modification of the Williams register whereby that register is provided with a second input independent of the crossbar switch train. The PBX attendant is provided with means effective on certain types of calls for automatically conditioning the register with the number of the called station via this second input by a single key operation. Portions of the drawing have been adapted from the Williams and Benson et al. disclosures as an aid in teaching an application of the invention.

The detached contact method of circuit representation is employed in the drawing. Detached contact representation is now well established in the art and is explained at length in the Williams patent. The following remarks are made to assist the general reader. In detached contact drawings, the motor elements such as relays are shown separate from the contacts controlled thereby. A relay is given a letter designation and a contact of that relay is given the same letter designation. Make contacts are represented by the symbol X on a conductor, break contacts by a short line segment transverse to a conductor, and transfer contacts by a combination of the latter symbols at the intersection of two conductors. Substation key SK40 in the drawing is shown conventionally.

The portions of the drawing adapted from the Williams and Benson disclosures are shown schematically so that greater detail will not interfere with the explanation and understanding of the instant invention. The switch train comprising crossbar switches 1 is shown and fully described in the Williams patent. Switches 1 are effective under the control of marker 2 to interconnect, via horizontal links, vertically appearing units such as typical subscriber's station 5 and register 3.

Marker 2 is shown and described in the Williams patent, with the exception that conductor KPCO is shown and described in the Benson et al. patent. The marker is effective in response to a request for service (the subscriber going "off hook") at station 5 to cause station tip and ring conductors T–S and R–S to be extended via crossbar switches 1 to the respective dial pulse input conductors T–R and R–R of register 3. The marker is also effective upon the registration in register 3 of the designation of a called station to cause to be completed a connection between the calling and called stations via crossbar switches 1 in accordance with the registered information. This is described in detail in the Williams patent.

Register 3 is adapted from the Williams and Benson et al. disclosures and modified in accordance with the instant invention. Designations used in the Williams and Benson et al. drawings to identify elements reproduced in the present drawing have been retained.

Line relay L operates upon the extension of a calling line to register 3 and responds to incoming dial pulses, as shown and described in the Williams patent. Pulse counting circuit 9 (as explained in the Benson et al. patent) is driven by line relay L to ascertain and temporarily store the succeeding tens and units digits of an in-dialed number. Tens digit register 7, shown in the Williams and Benson et al. disclosures, stores an incoming tens digit and informs the marker, by grounding a conductor such as T4–0, of the identity of that digit. Units digit register 8, shown and described in the Benson et al. patent, stores and apprises the marker of the identity of a received units digit. Relays KPC and KRA are shown and fully described in the Benson et al. patent. Relay KPC is a key pulse class of service relay which when operated permits the direct introduction of digits into the register via conductors C1 to C0. Key register advance relay KRA controls the introduction sequence of digits incoming over leads C1–C0 and also controls steering relay STR (whose operating circuit shown in detail in the Benson et al. patent, is indicated symbolically here) which directs the incoming conductors C1–C0 to the appropriate digit register at the right time.

Relay PBD and slow-operate relay Y are introduced into the register in accordance with the instant invention. Pushbutton detection relay PBD differentiates between incoming calls which are to receive standard dial pulse service and those which are to be given special treatment which will permit direct station selection by the calling party. If relay PBD indicates that a direct station selection is to be made by the calling party, relay Y operates to place a battery signal on register tip conductor T–R and to operate relay KPC, thereby enabling the key pulse input.

Attendant's key pulse circuit 4 is shown and fully described in the Benson et al. patent. As discussed in detail there, common relay C and slow-operate relays T, U, and S help to control direct registration by advancing energized conductors such as TK4 and UK0 to register 3 in synchronism with the advance of register steering relay STR. This operation will be described in greater detail hereinafter.

Typical subscriber's station 5 is provided with a standard station line comprising tip and ring conductors T–S and R–S respectively, dial contacts 11, subset 6, and switchhook contact 10. Such provisions are well known in the art. In addition, and in accordance with the invention, the station is provided with one or more keys such as key SK40. Each such key is uniquely associated with the designation of another station in the PBX (station 40 in the case of the exemplary key SK40). When operated after the station line has been extended to register 3, key SK40 grounds both sides of the line and energizes identification conductor IC40. When the register detects this grounding of the line, it returns battery on tip conductor T–S. This operates start relay ST individually associated with station 5. Relay ST operated extends identification conductor IC40 to prime key pulse circuit 4 according to the designation of the called station, and also operates relay C to begin the automatic registration process. When other keys, and consequently other identification conductors, are provided, relay ST operated will extend them all to key pulse circuit 4, but only the conductor corresponding to the called station will have been significantly energized by its operated key.

The placing of a call in accordance with the invention will now be described.

The calling party at station 5 wishing to place a call to station 40 of the exchange will first pick up his receiver (not shown), closing switchhook contact 10 to complete his line loop in the usual manner. This loop closure will be detected by marker 2 which will respond to extend station conductors R–S and T–S via switches 1 to register conductors R–R and T–R, respectively. The marker 2 similarly furnishes ground (by means not shown herein) to the winding of slow-operate relay Y through the normally closed break contacts 10 of relay S, 10 of relay RA and 1 of relay PBD; this arrangement is indicated symbolically by the dotted lines between ground and break contact 10 of relay S. Register 3 will return dial tone to calling station 5 in the usual manner by circuits disclosed in the Williams patent but omitted here for clarity. In addition, register 3 will supply battery and ground to calling station 5 in a circuit which may be traced from ground via the winding of relay PBD, the break side of the transfer contacts of relay Y, via conductor T–R, switches 1, station conductor T–S, through subset 6 including switchhook contact 10, diode 12, the break side of dial transfer contacts 11, station conductor R–S, switches 1, conductor R–R, and thence to battery via the winding of polarized line relay L. Relays PBD and L operate in this circuit.

No circuit action so far occurring precludes the calling party from dialing the extension number of the called party. Should this be done, relay L will follow the incoming dial pulses, releasing at the beginning of each pulse and reoperating at the end of each pulse in the usual way. Upon the first release of relay L, a register advance relay RA (not shown) will operate in the usual well-known manner to thereby shunt down relay PBD at its contact 11 and to interrupt the operating path for relay Y at its contact 10. This positively disables the direct selection function. The register operation on dialed calls is fully described in the Williams and the Benson et al. patents.

Assuming the calling party at station 5 wants to directly select PBX station 40, he will, upon hearing dial tone indicating that the register is attached, operate key SK40. At its contacts 3, key SK40 applies ground to identification conductor IC40. This ground is not extended beyond start relay ST's open make contacts 2 and 3 at this time. At its contact 2, key SK40 applies holding ground to the station ring conductor R–S. Line relay L is thus held operated in a circuit which may be traced from ground on conductor R–S via switches 1, register ring conductor R–R, and thence to battery via the winding of relay L. Finally, at its make contact 1, key SK40 operated shunts down register relay PBD by applying ground via the winding of start relay ST to station tip conductor T–S. The inactive circuit thus created may be traced from ground on conductor T–S, through switches 1, over register tip conductor T–R, the break side of transfer contact 1 of relay Y, and thence to ground via the winding of relay PBD. Relay PBD releases. With relay PBD released, relay RA not yet operated due to an initial dial pulse, and relay S of key pulse circuit 4 not operated, relay Y operates. If more than one register is provided, the operate path of relay Y may include additionally a mutual lockout provision, such as is well known in the art, as to relays Y in the other registers. In this way, direct station selection would be afforded by only one register at a time, should this prove necessary or desirable.

When relay Y operates, it closes at its make contact 2 an operate path for key pulse class of service relay KPC. The latter relay operates to enable the key pulse input to register 3 as follows. Relay KPC make contacts 1–10, of which only contacts 4 and 10 are shown, extend conductor C1–C0, respectively, into register 3. Relay KPC make contact 11 permits relay KRA to operate from ground via break contact 12 of relay T in key pulse circuit 4. Relay KPC make contact 13 prepares the operate path for tens relay T in key pulse circuit 4. The key pulse input to register 3 is thus enabled.

The second principal effect of the operation of relay Y is the application of battery to register tip conductor T–R via the make side of relay Y transfer contact 1. The break side of relay Y transfer contact 1 positively disables relay PBD. Battery on conductor T–R is extended back to calling station 5 via switches 1 and station tip conductor T–S, and thence over make contact 1 of key SK40, conductor 18, and through the winding of start relay ST to ground. Relay ST operates in this circuit. The provision of diode 12 in station ring conductor R–S prevents the battery signal from passing directly to ground via key SK40 make contact 2.

At this point in the circuit operation, then, relays L, KPC, KRA, Y and ST are operated, relay PBD is positively disabled, identification conductor IC40 is energized, and automatic registration can begin.

Relay ST may be conveniently located at or near key pulse circuit 4. The conductors that need to be provided between this relay and a station such as station 5 will then be only a single operating conductor 18 and one identification conductor such as conductor IC40 for each direct selection key provided at the station.

With the operation of relay ST, conductor IC40 is extended to key pulse circuit 4 via relay ST make contacts 2 and 3. Diodes 14 and 15 prevent circulating currents from arising. Extension conductor KT4 represents the tens digit 4 of the called station's number. Conductor KT4 is connected to key pulse circuit 4 tens conductor TK4 which is one of ten such conductors (only TK0 and TK4 being shown, each representing a different decimal tens digit). Similarly, extension conductor KU0 is connected to the key pulse circuit units conductor UK0 which represents the units digit 0 and is one of ten such units digit representative conductors (only UK0 and UK4 being shown). The provision of ten tens digit conductors TK1 to TK0 and ten units digit conductors UK1 to UK0 is fully shown and described in the Benson et al. patent, supra. Just as identification conductor IC40 is extended to key pulse circuit conductors representing the appropriate tens and units digits, so may other identification conductors be extended, whether they originate at station 5 or at other stations similarly equipped. It will be noted that in the transition from identification conductor IC40 to tens and units digit conductors TK4 and UK0, a translation from "one out of a hundred" to "two out of twenty" code is effected. It is obvious that various other translations are possible, depending upon the size and registration mechanism of the exchange in which the invention finds application.

At the same time relay ST extends conductor IC40 to key pulse circuit 4, it initiates, at its make contact 1, the automatic registration operation of that circuit by completing an obvious operating path for common relay C. It will be noted that the tens digit (4) is registered without the intervention of any of the control relays C, T, U, or S. Thus the tens digit 4 is registered in tens digit register 7 by relay TD4 in a circuit which may be traced from ground at station 5, over conductor 13, make contact 3 of key SK40, identification conductor IC40, make contact 2 of relay ST, diode 15, conductor KT4, conductor TK4, break contact 4 of relay T, conductor C4, make contact 4 of relay KPC, the break side of transfer contact 4 of steering relay STR, and thence to battery via the winding of relay TD4. Relay TD4 operates and extends ground to marker 2 on conductor T4–0 via its make contact 2. Relay TD4 also locks itself operated at its make contact 1.

With relays KPC and C operated, an obvious circuit is completed for energizing the winding of tens relay T. Relay T is slow to operate, and during the delay thus provided, the tens digit 4 is registered as described above. When relay T finally operates, it opens at its break contact 4 the previously traced operating circuit for register relay TD4. The latter relay does not release, however, since, as previously noted, it is locked operated. At its make contact 1, relay T completes an obvious circuit for energizing the winding of slow-to-operate units relay U. At its make contact 11, relay T locks itself operated under the control of relay KPC. Finally, at its break contact 12, relay T opens the previously traced operating path for register advance relay KRA.

With the release of relay KRA, steering relay STR is operated in circuits indicated symbolically here, but fully described in the Benson et al. patent. At its transfer contacts 1 through 10, only contacts 4 and 10 being shown here, relay STR diverts the incoming conductors C1 through C0 from tens digit register 7 to units digit register 8. Register 3 is thus prepared to receive the units digit of the called station's number.

In the time it takes slow-to-operate relay U to operate, the described advance of register 3 takes place. Relay U then operates. At its make contact 11, relay U permits relay KRA to reoperate from ground, relay U make contact 11, relay S break contact 7, relay KPC make contact 11, and thence to battery through the winding of relay KRA. At its make contact 12, relay U completes an obvious path for energizing the winding of slow-to-operate relay S. At its make contact 10, relay U permits the units digit 0 to be registered on relay UD0 in units digit register 8. The operating circuit for relay UD0 may be traced from ground, conductor 13, make contact 3 of key SK40, conductor IC40, relay ST make contact 3, diode 14, conductor KU0, conductor UK0, make contact 10 of relay U, conductor C0, relay KPC make contact 10, and the make side of relay STR transfer contact 10, to battery via the winding of relay UD0. Relay UD0 operated indicates that the units digit of the called station number is zero, and prepares to pass this information to marker 2 by grounding, at its make contact 2, conductor U0–0. Relay UD0 locks operated at its make contact 1.

With the tens and units digits 4 and 0 registered on relays TD4 and UD0 respectively, registration is completed and it only remains to notify marker 2 of this fact and to restore the special registration apparatus. This is accomplished when relay S finally operates. At its break contact 7, relay S opens the operating path for relay KRA. Relay KRA in releasing causes marker 2 to be summoned to complete the desired connection in accordance with the registered information, as is fully described in the Benson et al. patent. At its break contact 10, relay S opens the operating path for relay Y, causing the latter relay to release. Released relay Y opens at its make contact 2 the operating path for relay KPC. Relay KPC releases to disable the key pulse input to the register and to cause relay T to release. Relay T released releases relay U. At its transfer contact 1, released relay Y opens the battery connection to register 3 tip conductor T–R. Relay Y thus opens the previously traced operating path for station start relay ST, which releases. Relay ST released releases relay C, which in turn releases relay S. The call now proceeds as described in the Williams patent, supra.

In order to most clearly exemplify the invention, use has been made of the previously described parallel-to-series-parallel conversion circuit comprising attendant's key pulse circuit 4 and register 3 steering relay STR. It will be apparent to those skilled in the art, however, that the invention is of much wider scope. For example, digit representation conductors such as KT4 and KU0 might be extended in parallel to digit registers such as registers 7 and 8. Thus, it is to be understood that the described arrangement is merely illustrative of the application of the principles of the invention; numerous other arrangements may be devised by those skilled in the art without departing from the spirit and scope of the invention.

What is claimed is:

1. In an automatic telephone system, a register having first and second inputs responsive to different type signal inputs respectively, a subscriber station having direct station selection means and having a station line extendable to said first input, data representative means indicative of a directly selected station extendable to said second input, means at said first input operative upon the operation of said direct selection means when said line is extended thereto to place a special signal on said line, and connecting means operative in response to said special signal to extend said data representative means to said second input.

2. In an automatic telephone exchange, a switch train, a register having a switch train input and an auxiliary input responsive to different type signals respectively, a subscriber's station having a station line extendable to said switch train input via said switch train and having data representative means extendable to said auxiliary input over a path independent of said switch train, direct station selection means at said station operable to energize said representative means, and discrimination means at said switch train input operative in response to the operation of said direct station selection means when said line is extended thereto to enable said auxiliary input.

3. In an automatic telephone exchange, a register having first and second inputs responsive to different type signals respectively, a subscriber station having direct station selection means including a station line extendable to said first input, data representative conductor means indicative of a directly selected station energized upon the operation of said direct station selection means and connectable to said second input, means at said first input operative upon the operation of said direct selection means when said line is extended thereto to place a special signal on said line, and connecting means operative in response to said special signal to connect said data representative means to said second input.

4. In an automatic telephone exchange, a register adapted to record data received according to a first mode of signaling at a first input and data received according to a second mode of signaling at a second input, a subscriber station having operable direct station selection means and having a station line extendable to said first input, data representative conductor means representative of directly selected stations energized upon the operation of said selection means and connectable to said second input according to said second mode of signaling, means at said first input operative upon the operation of said selection means when said line is extended thereto to place a special signal on said line, and connecting means operative in response to said special signal to connect said data representative means to said second input.

5. In an automatic telephone exchange, a register having a dial pulse input and an energizable key pulse input, a subscriber station having a station line, dial pulse generating means, and direct station selection apparatus, means responsive to a request for service at said station for connecting said line to said dial pulse input, means in said register for registering dial pulses generated by said generating means and appearing at said dial pulse input, means in said register responsive to the operation of said selection apparatus to energize said key pulse input and to place a special signal on said station line, and means responsive to the appearance of said special signal on said line to condition said second input according to particular data.

6. In an automatic telephone exchange, a register having a dial pulse input and an energizable key pulse input, a subscriber station having a station line, dial pulse generating means, and direct station selection apparatus, means responsive to a request for service at said station for connecting said line to said dial pulse input, means in said register for registering dial pulses generated by said generating means and appearing at said dial pulse input, means in said register responsive to the operation of said selection apparatus to energize said key pulse input and to place a special signal on said station line, a selection conductor representing particular data and energized upon the operation of said direct selection apparatus, and relay means individual to said station and operated by said special signal to extend said selection conductor toward said key pulse input.

7. In an automatic telephone exchange, a register having a dial pulse input and an energizable key pulse input, a subscriber station having a station line, dial pulse generating means, and direct station selection apparatus, means responsive to a request for service at said station for connecting said line to said dial pulse input, means in said register for registering dial pulses generated by said generating means and appearing at said dial pulse input, means in said register responsive to the operation of said selection apparatus to energize said key pulse input and to place a special signal on said station line, means for automatically conditioning said register according to a plurality of data via said key pulse input, a selection conductor representing a particular plurality of data energized upon the operation of said direct selection apparatus and terminable in said conditioning means in accordance with said particular plurality of data, and a relay individual to said station operated by said special signal to terminate said selection conductor in said conditioning means.

References Cited by the Examiner

UNITED STATES PATENTS

| | | | |
|---|---|---|---|
| 2,283,395 | 5/42 | Strickler | 179—18 |
| 2,651,680 | 9/53 | Bray et al. | 179—18 |

ROBERT H. ROSE, *Primary Examiner.*

WALTER L. LYNDE, *Examiner.*